United States Patent

Mohamed

(10) Patent No.: US 7,823,060 B2
(45) Date of Patent: Oct. 26, 2010

(54) UNDO/REDO ARCHITECTURE ACROSS MULTIPLE FILES

(75) Inventor: Ibrahim A. Mohamed, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 10/165,749

(22) Filed: Jun. 7, 2002

(65) Prior Publication Data

US 2004/0205663 A1     Oct. 14, 2004

(51) Int. Cl.
*G06F 17/00* (2006.01)
*G06F 11/00* (2006.01)
*G06F 9/44* (2006.01)

(52) U.S. Cl. .............. 715/234; 715/243; 715/255; 714/19; 717/114

(58) Field of Classification Search ........... 715/530, 715/531, 243, 255, 234; 717/110, 114; 714/19, 714/110
See application file for complete search history.

(56) References Cited

U.S. PATENT DOCUMENTS

| | | | | |
|---|---|---|---|---|
| 5,990,906 A | * | 11/1999 | Hudson et al. ............... | 345/666 |
| 6,044,387 A | * | 3/2000 | Angiulo et al. .............. | 715/533 |
| 6,182,274 B1 | * | 1/2001 | Lau ............................. | 717/104 |
| 6,527,812 B1 | * | 3/2003 | Bradstreet .................... | 715/530 |
| 6,543,006 B1 | * | 4/2003 | Zundel et al. ................. | 714/19 |
| 6,856,993 B1 | * | 2/2005 | Verma et al. ................. | 707/101 |
| 7,013,284 B2 | * | 3/2006 | Guyan et al. .................. | 705/9 |
| 7,428,725 B2 | * | 9/2008 | Niyogi et al. ................ | 717/109 |
| 2001/0049704 A1 | * | 12/2001 | Hamburg et al. ............ | 707/530 |
| 2002/0004815 A1 | * | 1/2002 | Muhlestein et al. ......... | 709/201 |
| 2002/0049788 A1 | * | 4/2002 | Lipkin et al. ................ | 707/513 |
| 2002/0108102 A1 | * | 8/2002 | Muhlestein et al. ......... | 717/124 |
| 2003/0009481 A1 | * | 1/2003 | Greenberg ................... | 707/200 |
| 2003/0025728 A1 | * | 2/2003 | Ebbo et al. ................... | 345/744 |
| 2003/0028685 A1 | * | 2/2003 | Smith et al. ................. | 709/328 |
| 2003/0105816 A1 | * | 6/2003 | Goswami ..................... | 709/204 |
| 2003/0167356 A1 | * | 9/2003 | Smith et al. ................. | 709/328 |
| 2003/0172196 A1 | * | 9/2003 | Hejlsberg et al. ........... | 709/328 |
| 2003/0227487 A1 | * | 12/2003 | Hugh .......................... | 345/777 |
| 2003/0237051 A1 | * | 12/2003 | LaMarca et al. ............. | 715/513 |
| 2004/0125130 A1 | * | 7/2004 | Flamini et al. .............. | 345/738 |
| 2004/0186817 A1 | * | 9/2004 | Thames et al. ................ | 707/1 |
| 2004/0205340 A1 | * | 10/2004 | Shimbo et al. .............. | 713/165 |
| 2004/0210854 A1 | * | 10/2004 | Pfeil et al. ..................... | 716/1 |
| 2004/0260974 A1 | * | 12/2004 | Livshits ....................... | 714/19 |

FOREIGN PATENT DOCUMENTS

WO     WO 01/98936     12/2001

OTHER PUBLICATIONS

Stephenson, C.J. "On the Structure and Control of Commands", 1973, ACM Press, ISSN: 0163-5980, pp. 22-26.*

(Continued)

*Primary Examiner*—Rachna S Desai
(74) *Attorney, Agent, or Firm*—Woodcock Washburn LLP

(57) ABSTRACT

Editing operations are monitored for operations for which information must be stored in order to properly apply an undo or undo/redo sequence to plurality of files. A snapshot is taken and persisted before such an operation is performed. Upon the execution of an undo or redo command, the persisted snapshot is retrieved and applied to the newly generated editing element.

16 Claims, 12 Drawing Sheets

OTHER PUBLICATIONS

XML Spy 4.0 Manual, pp. 1-400, Copyright 2001.*

Zafer, Ali Asghar, "NetEdit: A Collaborative Editor", Thesis submitted to the Faculty of Virginia Polytechnic Institute and State University, Apr. 23, 2001.*

Ribiolo, Daniel, et al., "Microsoft .Net Explained", 2001.*

Prakash, Atul and Michael J. Knister, "Undoing Actions in Collaborative Work", ACM Database, CSCW 92 Proceedings, 1992.*

Homer, Alex and Dave Sussman, "Inside ASP.Net Web Matrix", Wrox press 2002.*

Grundy, John et al., "Inconsistency Management for Multiple-View Software Development Environments", IEEE Transactions on Software Engineering, vol. 24, No. 11, Nov. 1998.*

Eclipse Resources, http://www.eclipse.org/resources, 2008.*

Merks, Ed, JavaOne, Sun's 2004 Worldwide Java Developer Conference, "The Eclipse Modeling Framework, Introducing Modeling to the Java Technology Mainstream", 2004.*

Damm, Christian, et al., "Tool Integration: Experiences and Issues in Using XMI and Component Technology", IEEE 2000.*

Sun, Chengzheng, "Undo as Concurrent Inverse in Group Editors", ACM Transactions on Computer-Human Interaction, vol. 9, No. 4, Dec. 2002, pp. 309-361.*

Cook, P. et al., "Incremental parsing in language-based editors: user needs and how to meet them", *Software—Practice and Experience*, 2001, 31, 1461-1486.

Macht, J. "New Medium, Old Rules—The On-Line Edior Comes of Age", *The Harvard Journal of Press/Politics*, 2001, 6(1), 128-131.

* cited by examiner

WebForm | X

Toolbox
Textbox
Button
Hyperlink

| WebForm | X |

Toolbox

Textbox          300

Button

Hyperlink

FIG. 7

| CodeBehind |
|---|
| Public Class WebForm |
| . . . . |
| . . . . |
| Private Sub Button 1 - Click (ByVal sender As System.Object, ByVal e As System.EventArgs)   700<br>End Sub |
| 500 |

FIG. 8

CodeBehind

Public Class WebForm — 902

Protected WithEvents Button1 As System.Web.UI.WebControls.Button

．
　　．
　　．

．
　　．
　　．

Private Sub Button 1 - Click (ByVal sender As System.Object, ByVal e As System.EventArgs)

Ehd Sub

FIG. 10

CodeBehind

Public Class WebForm                  1004

Protected With Events Button 1 As System.Web.UI.WebControls. Button

...

Private Sub Button 1 - Click (ByVal sender As System.Object, ByVal e As System.EventArgs) Handles Button1.Click Ehd Sub             1002a

Figure 11

UNDO/REDO ARCHITECTURE ACROSS MULTIPLE FILES

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2002, Microsoft Corporation, All Rights Reserved.

FIELD OF THE INVENTION

This invention relates to the field of computing and in particular to the field of editing tools.

BACKGROUND

In some editors it is possible to "back out" and "re-instate" changes made to a document. For example, in MICROSOFT WORD, a user can use an "undo" and "redo" function available from the standard toolbar to "undo" a change that was previously made or "redo" a change that was previously undone. This function can be performed multiple times. In other words, activating "undo" four times will undo the last four changes made to a document. Subsequently activating "redo" three times will redo three of those last four changes, effectively resulting in the same effect as activating "undo" once.

When performing certain types of tasks, such as performing certain types of programming projects using certain editors, the editor may open several documents. When a user edits or changes one document, changes are made to the other document or documents automatically to reflect the changes the user made to the first document. Typically, however, the undo/redo function does not extend across multiple documents. Hence problems may arise when, for example, an element is deleted from a document and then the delete function is undone. The element may be deleted in the first document and then be reinstated to its original condition (by the undo) but the corresponding changes to the related document may not be made, so that the related document is not properly reinstated to its original condition.

For example, in an active server page (ASP) file declarative tags (HTML, ASP directives, server controls and static text, and the user interface (UI) part) are combined with the code. In certain environments, the code either can be stored on the same page as the tags or on a separate page known herein as the Code-Behind page. When an element such as a control is deleted in the UI component, associated elements such as the declaration, events and properties of the control are deleted from the code file. Problems arise, however, for example, when the delete is undone. When the delete is undone, the declaration, properties and events should be reapplied to the related Code-Behind file, however, heretofore, no known method has been available to apply the undo (or undo/redo, etc.) to the related document because the undo/redo function has been confined to a single document. Hence it would be helpful if an undo/redo function could support undo/redo changes across multiple documents.

SUMMARY OF THE INVENTION

Editing operations are monitored for operations for which information must be stored in order to properly apply an undo, redo, or undo/redo sequence or the like to a plurality of files. A snapshot is taken and persisted before such an operation is performed. Upon the execution of an undo or redo command, the persisted snapshot is retrieved and applied to the newly generated editing element. Hence editing operations such as but not limited to undo/redo operations are performed essentially simultaneously to multiple files, wherein an editing operation such as an undo, a redo or the like, performed on one file is propagated to a related file or files automatically.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4 illustrates an exemplary blank WebForm;

FIG. 7 illustrates the exemplary WebForm of FIG. 4 which has had the button of FIG. 4 deleted;

FIG. 8 illustrates the exemplary Code-Behind file reflecting the deletion of the button;

FIG. 10 illustrates the exemplary Code-Behind file that results from an editor that does not support multiple undo/redo across multiple documents;

FIG. 11 illustrates the exemplary Code-Behind file that results from an editor that supports multiple undo/redo across multiple documents in accordance with one embodiment of the invention.

DETAILED DESCRIPTION OF THE INVENTION

Exemplary Computing Environment

Figure 1:
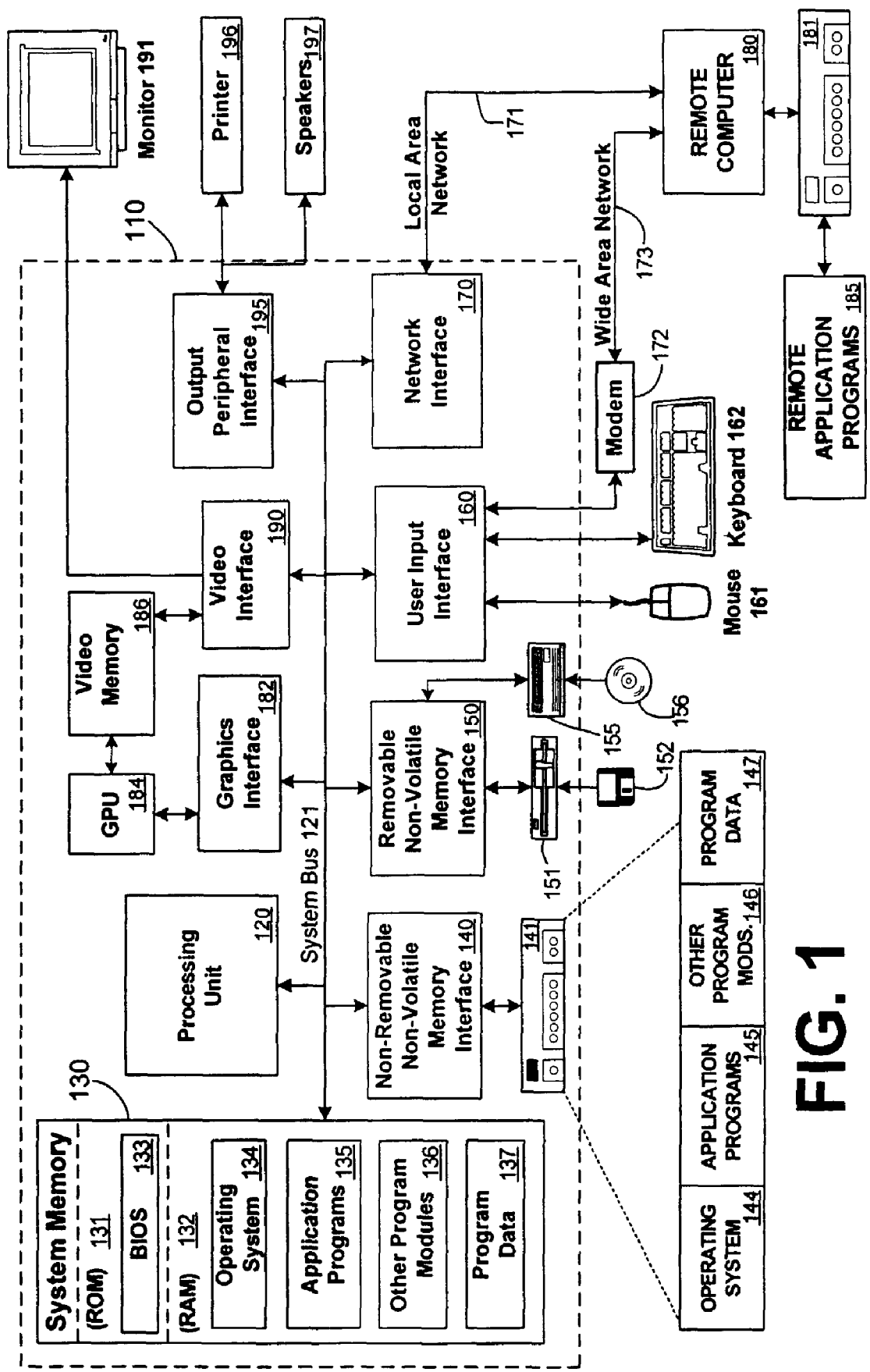
FIG. 1 is a block diagram of an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Undo/Redo System and Method

Overview

Figure 2:
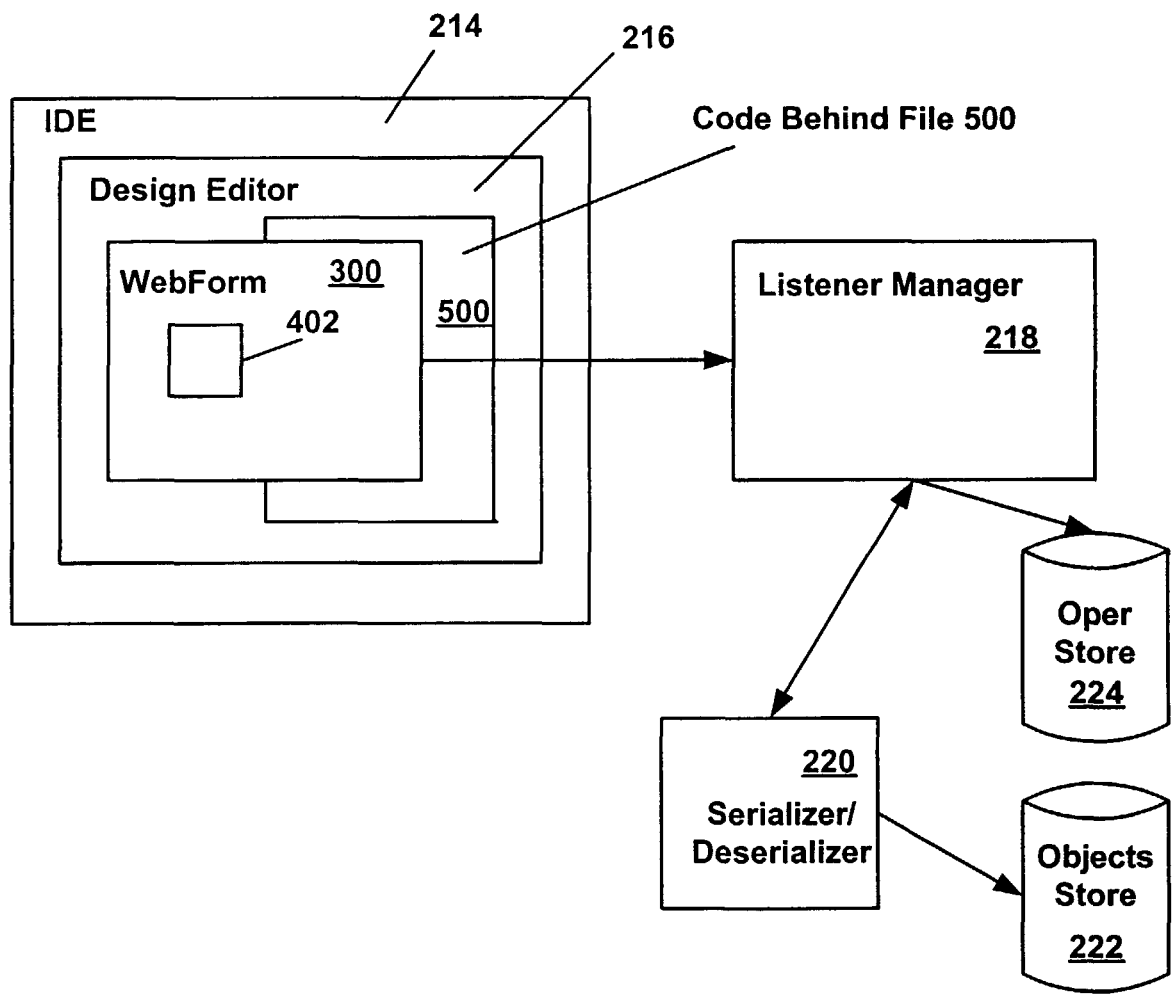
FIG. 2 is a block diagram of an undo/redo system in accordance with one embodiment of the invention.

FIG. 2 is a block diagram illustrating an exemplary system for multiple undo/redo operations across multiple files in accordance with one embodiment of the invention. Within an Integrated Design Environment (IDE) 214, a Design Editor 216 supports the editing of multiple documents (e.g., a WebForm file 300 and a Code-Behind file 500.) It will be understood that any particular files may be substituted for WebForm File 300 and Code-Behind file 500. The files chosen are exemplary only. The files may be homogeneous (i.e., the same type of file, e.g., two word-processing documents) or heterogeneous (i.e., different, e.g., a WebForm and a Code-Behind file). Additionally, although two files are used in the example, the invention contemplates that any number of files may be the subject of the undo/redo. Similarly, the Design Editor 216 may be any suitable editor including but not limited to a source code editor or a word processing program and may exist within any suitable environment 214. Finally, although the invention is described in the context of undo and redo operations, and sequences of undo/redo or redo/undo operations, other editing operations requiring the capture of additional information are contemplated by the invention.

When an editing operation is performed on an element (element one) in a first file, the editing operation associated with another element (element two) in a related file or files, a notification is sent to a listener object such as Listener Manager 218. If the operation is one for which information must be captured in order for an undo or a redo to be correctly performed, a snapshot (element three) of an aspect of element one of the first file or a snapshot of element two from the related file or files is taken by a serializer/deserializer 220 before the selection is operated on. The snapshot is stored in a snapshot store. In one embodiment, the snapshot is stored as an object in an object store 222. An operation unit including the operation and the element on which the operation was performed is added to an operation store 224. If an operation such as, for example, an "undo" is received, the appropriate operation and element are retrieved from the operation store 224, the snapshot is retrieved from the snapshot store and applied to the element of the first file to generate the element of the second file or the snapshot of the second element is retrieved from the snapshot store and is applied to the related file or files. An operation unit (e.g., custom undo unit) for the undo is stored in an operation store 224 maintained by Listener Manager 218.

For example, assume that two homogeneous or heterogeneous documents are being simultaneously edited and that document 1 is associated with a block of text comprising the words "Software Version 1.0". Assume further that the words "Software Version 1.0" are associated with the words "MixItWell Package" in document 2. If an editing operation such as "delete" or "cut" of "Software Version 1.0" is received, typically, "Software Version 1.0" will be deleted from document 1 and "MixItWell Package" will be deleted from document 2. In accordance with one embodiment of the invention, before "Software Version 1.0" is deleted from document 1 and before "MixItWell Package" is deleted from document 2, a notification is sent to Listener Manager 218 so that a snapshot of "MixItWell Package" is taken and stored in a snapshot store so that if the deletion of "Software Version 1.0" is undone, restoring "Software Version 1.0" to document 1, "MixItWell Package" is likewise restored to document 2.

In this case receipt of a undo delete command would result in "Software Version 1" being re-instated in document 1 and "MixItWell Package" being retrieved from the snapshot store and re-applied to document 2. An operation unit is added to the operation store 224. The operation unit includes an identifier of the edited element (e.g., "Software Version 1" and the operation performed (e.g., delete undo).

Undo/Redo Across Multiple Files in the NET Environment

One of the four major pieces of the NET framework is ASP.NET, the successor to Active Server Pages (ASP). ASP.NET is a programming environment for Web applications that run on the Internet Information Services (IIS) Web server and interact with users through a browser. ASP.NET loads dynamic Web pages, parses the pages for .NET code (i.e., code written in Visual Basic.NET, C#, JScript, or other .NET languages), and passes the code along to .NET language compilers and the CLR (Common Language Run-time). ASP.NET supports the CLR libraries, and languages. ASP.NET reduces the amount of code required to write a Web application or Web service and introduces new methods for implementing Web services. Additional information concerning the .NET platform produced by Microsoft Corporation of Redmond, Washington is described in PCT Publication WO 01/98936, having an international filing date of Jun. 22, 2001 and incorporated herein by reference.

ASP.NET developers create pages by assembling and customizing the Web Forms controls provided by the class libraries. Developers customize controls by setting properties, such as but not limited to font, size, placement and by supplying application-specific "event handler" code. This code is invoked upon each user request or response. Developers can also create custom controls, which could allow commercial independent software vendors (ISVs) to offer add-on libraries of ASP.NET controls similar to the libraries of ActiveX controls available for Visual Basic today.

Visual Studio Integrated Development Environment (IDE)

Visual Studio.NET provides tools including an editor for writing source code and wizards that automatically generate source code for common programming tasks. For example, developers can automatically generate the code required to call a Web service by dragging and dropping a link to the Web service site into the client application's source code in the IDE. Graphical editors in Visual Studio. NET enable developers to build Web Forms by dragging and dropping fields and other components from a toolbox. Visual Studio.NET provides a single Integrated Design Environment (IDE) that supports all of its programming languages and covers Web applications and desktop applications.

Figure 3:
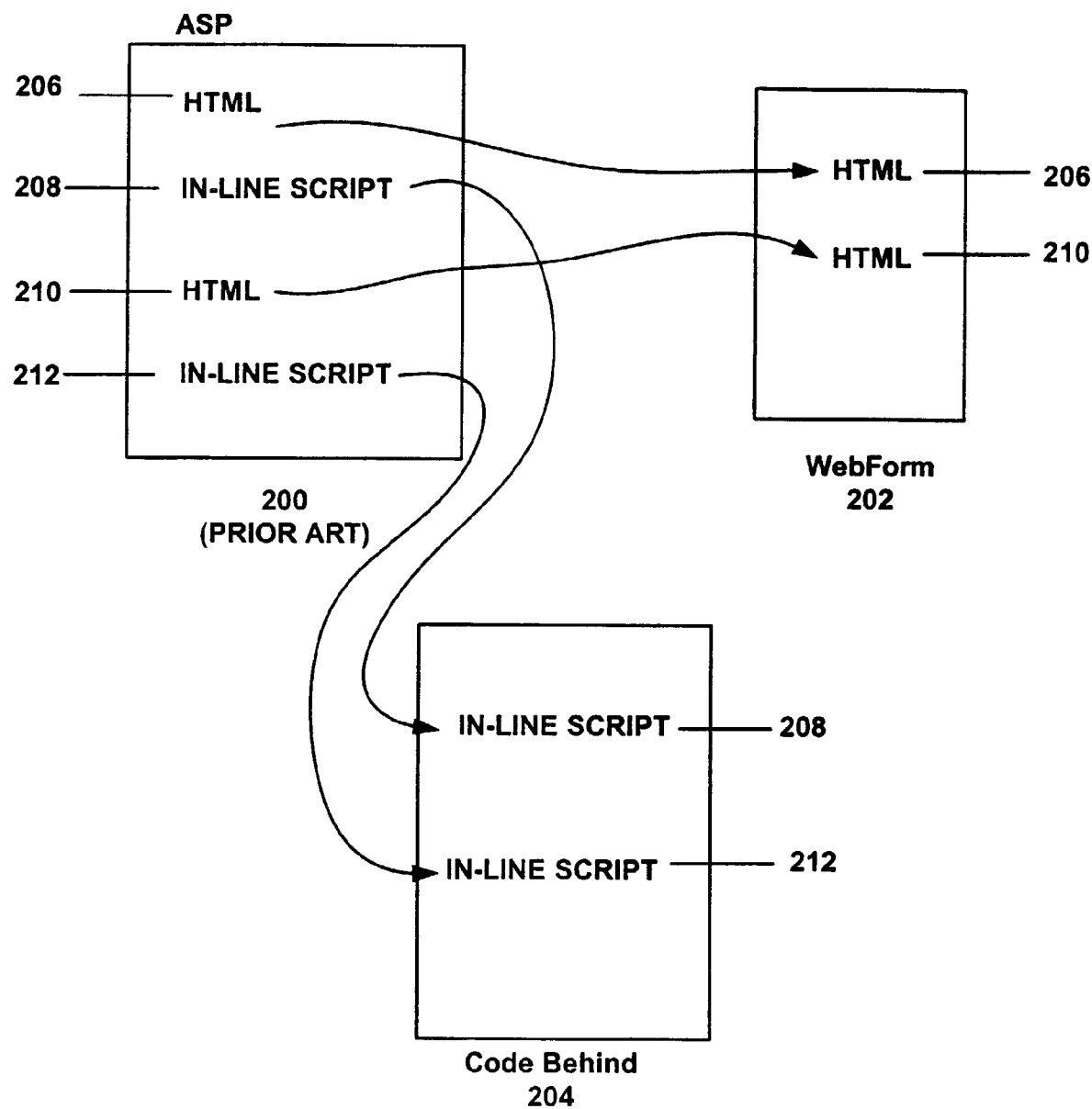
FIG. 3 is a block diagram illustrating an active server page (prior art) and a WebForm and Code-Behind File in accordance with one embodiment of the present invention.

FIG. 3 illustrates an active server page (ASP) file and a WebForm and Code-Behind file. Typically, the creation of an ASP page 200 requires the efforts of both a UI designer who controls the appearance of the page using tags such as HTML 206, 210, etc. and a developer who controls the informational processing of the page using in-line script or code 208, 212. Hence the ASP 200 typically includes UI HTML 206, 210 intermingled with code 208, 212. Typically, during development this single file (i.e., ASP 200) is modified by at least two individuals, the UI designer and the code developer. A number of inconveniences and potential problems might be expected in this scenario. For example, the designer and the developer would not be able to work concurrently on the same file and the page tends to become unreadable because HTML is intermingled with in-line script. Additionally, the opportunity for one person to make changes that adversely affect the other person's work exists.

Hence the .NET platform enables the separation of the UI portion 202 (called a Web form and preferably denoted by a file extension of "aspx" or "ascx") of the ASP.NET page from the code part 204 (preferably denoted by a file extension of "cs" if the code is written in C# or "vb", if the code is written in Visual Basic). The file that contains the code part is called herein the "Code-Behind" or "Code-Beside" file. At runtime, the two files are compiled into one file.

Within the Design Editor 216 of the IDE 214, an ASP.NET developer can create a page by assembling and customizing the Web Forms controls provided by the class libraries. A Web Form control is a component embedded in a Web page and that runs on a Web server. When a page is accessed, the Web Forms controls embedded in the page accept and validate the user's input and generate the appropriate HTML output in response. Web Forms controls include simple form input fields and buttons and complex elements such as a grid control that enables users to view and edit live database data as is done, for example, in a spreadsheet like Excel. Web Forms provide built-in code to handle common tasks such but not limited to:

Validating input data (e.g., preventing a user from entering letters into a "quantity" field).

Keeping track of page state and displaying the state appropriately when the user refreshes the page in the browser (e.g., input field controls display their last entered value).

Determining what browser version the user has and adapting output to that browser.

A developer can customize a control by setting the properties of provided controls. The properties used for customization may include but are not limited to font, size, and placement. Controls can also be customized by supplying application-specific "event handler" code which is invoked upon a user request or response. A developer can also create a custom control, (e.g., a custom control may be developed by a commercial independent software vendor (ISV) so that add-on libraries of ASP.NET controls could be added similar to the libraries of ActiveX controls available for Visual Basic today).

Typically, a control is uniquely identified in the Code-Behind file using the attribute ID (e.g., ID=Button1 might identify a first button on a page.) Hence in the Code-Behind file a declaration for the control will exist, as will events and properties associated with the control. Each event is associated with an event handler. During runtime, an instance of a class (e.g., an instance of a Button class) is generated for each control. The instance of a class (the object) is associated with the defined properties such as ID (e.g., Button1), backcolor (e.g., red), text (e.g., "Hello"), an event (e.g., a click event) and so on.

Now assume that two heterogeneous files are being edited, where the first file is a WebForm document 300 and the second file is the Code-Behind file 500. It should be understood that while in this example the two files are heterogeneous, the files in question could alternatively be homogeneous files. Assume that WebForm document 300 includes a control 402. Control 402 may be associated with state, that is, particular values to which characteristics or properties of the control have been set. The state of the control may be associated with particular code in Code-Behind file 500 such as a ClickEvent and event handler. Assume that user input has been received that indicates that an editing operation (e.g., a delete of control 402) has been received. Before the control is deleted from the WebForm document 300 and the code associated with the state of the control is deleted from the CodeBehind file 500, a notification is sent to a listener object (e.g., Listener Manager 218) and a snapshot of the state of the control being deleted is taken by the serializer/deserializer 220 and stored (e.g., as an object) in a snapshot store, (e.g., object store 222).

For example, if the input received indicates that the control 402 (e.g., Button1) is to be deleted from WebForm 300, a notification is sent to Listener Manager 218 so that before Button1 is deleted from the form, a snapshot of the state of Button1 is taken by the serializer/deserializer 220 and stored as an object in object store 222.

Thus, it should be understood that any element or any aspect of the element may be captured by the snapshot. The use of state in the example above is merely exemplary. In one embodiment, operations on an element for which a snapshot is required (e.g., cut, delete and the like) may be determined by the presence of an "accountable" attribute, but any suitable method of determining such operations is contemplated by the invention. Similarly, it should be understood that serializer/deserializer 220 may be any appropriate module capable of capturing an element or aspect of an element, such as but not limited to, the state of a control. The captured element or aspect of an element, in one embodiment of the invention, is a code object and is stored in an object store 222 but it should be understood that the element or aspect of the element may be captured as an object, code object, string, XML, BLOB or in any other suitable fashion and may be stored in any suitable store. An operation unit (e.g. custom undo unit) that identifies an editing operation on an element is stored in an operation store 224. In one embodiment of the invention, the operation store 224 is a LIFO stack. The operation store 224 may include different kinds of operations (e.g., both undo and redo operations and the like) or one store may be maintained for each different type of operation (e.g., undo operations may be stored in an undo store and redo operations may be stored in a redo store).

For example, if an undo is subsequently received for the deletion of Button1, a new instance of Button1 is re-instated in WebForm document 300, the pre-deletion state of Button1 is retrieved by retrieving the snapshot stored in object store 222 for Button1, the retrieved code object is applied to Button1 and the resultant code is applied to Code-Behind file 500. An operation unit that identifies Button1 (the control that was deleted) and the operation (undo delete) is added to the operation store 224. An operation unit is added to the operation store 224 so that a subsequent redo operation can be performed, if requested. While the examples above have detailed a delete operation followed by an undo, it should be understood that other operations requiring the capture of additional information such as state of a control are contemplated by the invention (e.g., the redo of an "undone" operation or any sequence of undo/redo operations or the like).

Figure 5:
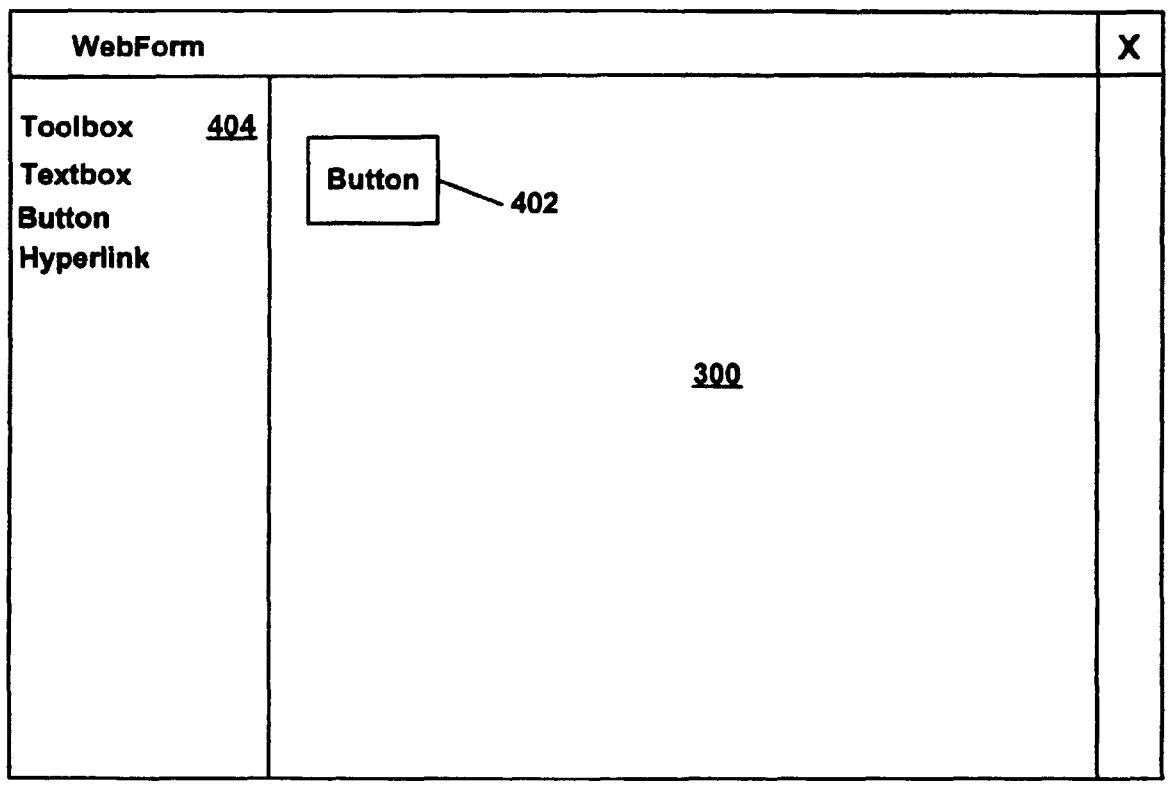
FIG. 5 illustrates the exemplary WebForm of FIG. 3 to which a button has been added.
Figure 6:
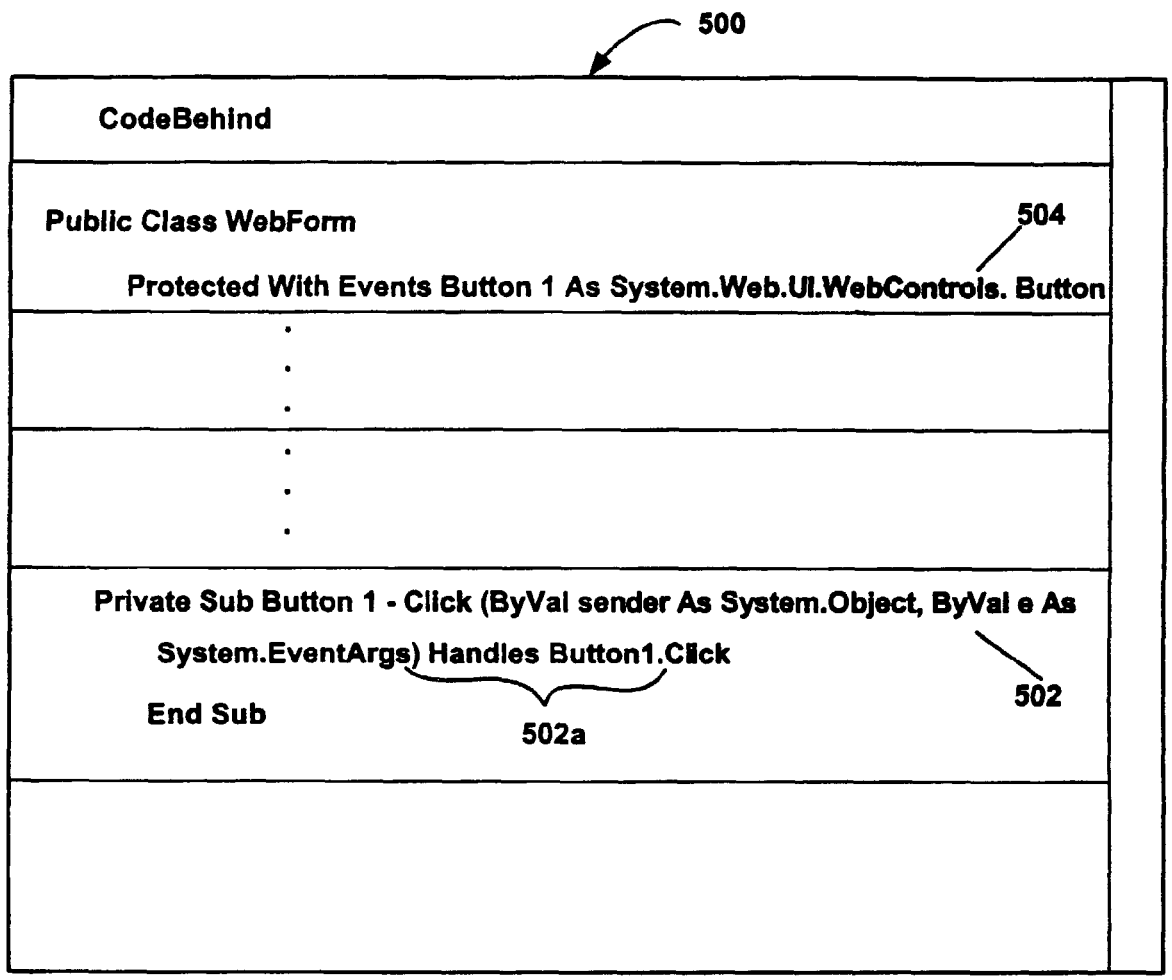
FIG. 6 illustrates an exemplary Code-Behind file generated by the VISUAL STUDIO design editor.

For example, and referring now to FIG. 4, a blank default WebForm document 300, containing no controls, etc. is illustrated. FIG. 5 illustrates the WebForm document 300 to which a Button server control (Button1) 402 was added from the toolbox 404. The control is selected by default after being inserted into the document 300. Upon double-clicking on the button 402 (or by selecting the control and pressing the "Enter" key) a default event handler for the control is generated and a window displaying the code-behind is displayed. In the case of the Button server control 402, a Click handler is generated. FIG. 6 illustrates the code-behind document 500. The declaration 504 for Button1 402 is illustrated. Code for the event handler that was generated as a result of the double-click action is referenced by reference numeral 502. The "Handles" clause 502a is the way the event handler function is hooked to the corresponding control in VisualBasic (in this case Button1, 402).

FIG. 7 illustrates WebForm document 300 in which Button1 402 has been selected and deleted. Switching back to the Code-Behind document 500 illustrated in FIG. 8, it can be seen that the declaration for Button1, 504 has been removed and the event hookup ("Handles" clause 502a) has been removed. Thus, the Button1$_{13}$ Click function is an orphaned function.

Figure 9:
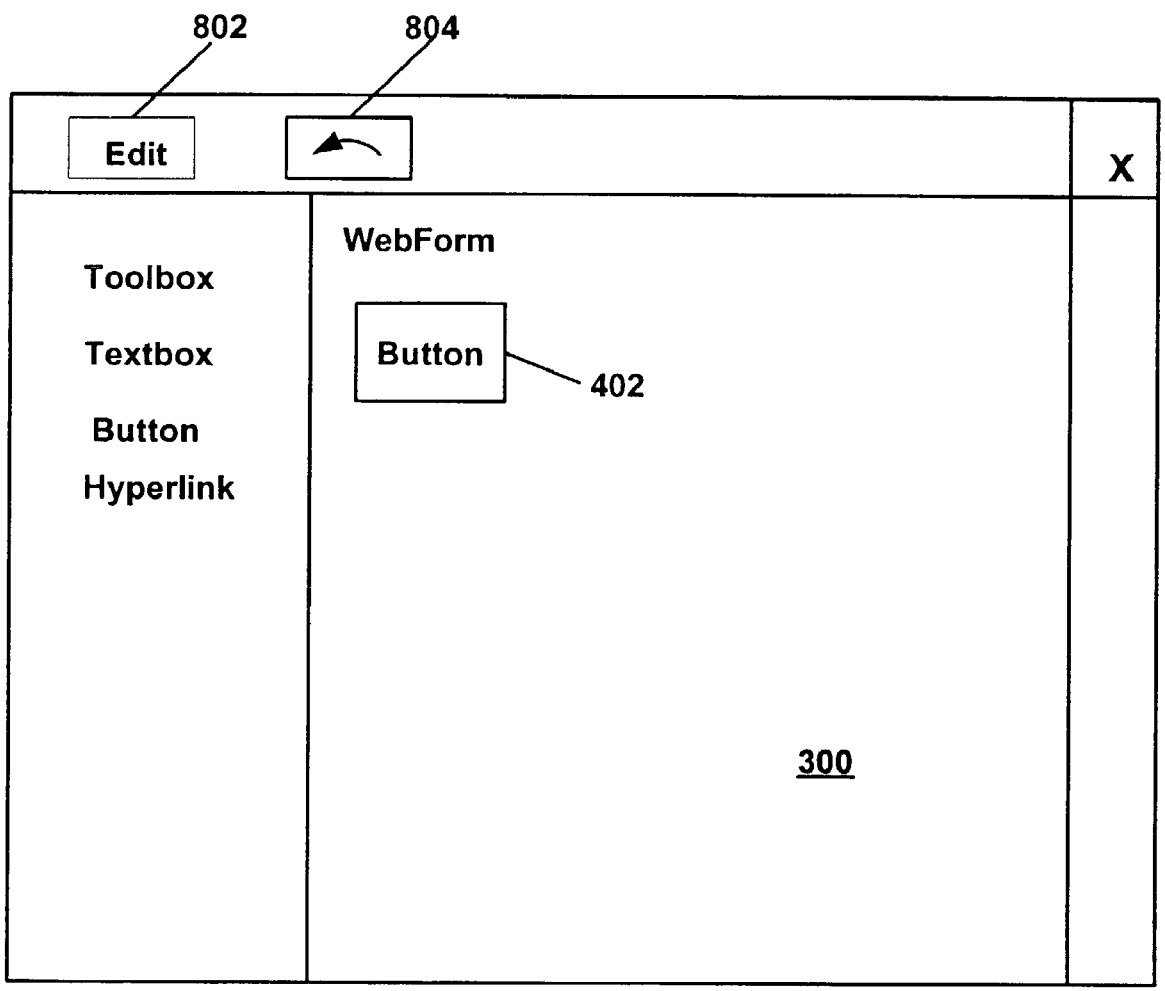
FIG. 9 illustrates the exemplary WebForm of FIG. 4 which has had the deletion of the button undone.

FIG. 9 illustrates WebForm document 300 after the "Edit" selection 802 of the menu bar and the "undo typing" option was selected (not shown), control-z was entered, or the left arrow 804 on the icon bar was clicked. It can be seen that Button1 402 has reappeared on document 300. Switching back to the Code-Behind document 500, illustrated in FIG. 10, it can be seen that, in the existing designer editor that does not support multiple undo/redo across documents, the Button declaration is back 902 but the Handles Clause is still gone. Hence, the Button1_Click function is still an orphaned function and is not hooked up to the Button1 control. Referring now to FIG. 11, it can be seen that, in the designer editor 216 of the present invention, which supports multiple undo/redo across documents, the Button1 declaration 1004 is back and the "Handles" Clause 1002a is also back.

Figure 12:
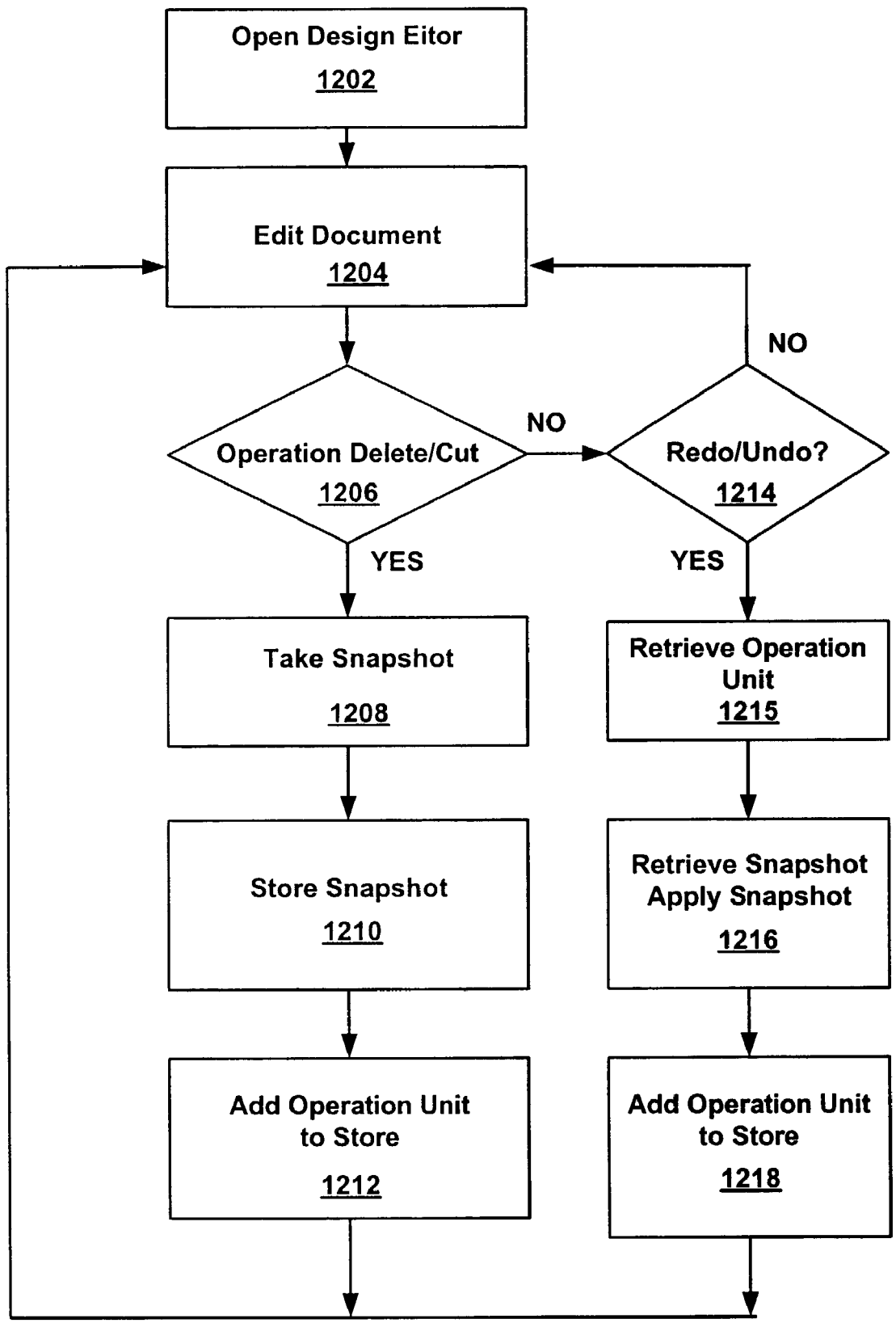
FIG. 12 is a flow diagram of an undo/redo method in accordance with one embodiment of the invention.

FIG. 12 illustrates a method for performing a multiple undo/redo in accordance with one embodiment of the invention. At step 1202, a file such as, but not limited to a document, is opened by an editor in accordance with the present invention. A related file or files is also opened. The files may be related implicitly or explicitly. The related files may be opened automatically by the editor or may be selected to be opened by the user. At step 1204 the file is edited. The associated file or files may also be automatically modified. In one embodiment the editor may make the same changes made to the first file to the related file or files or alternatively, the editor may make changes that are not the same but are determined by the changes made to the first file to the related file or files. If, at step 1206, it is determined that the operation performed is one that may be the object of a subsequent undo or redo or the like and that operation would require saving information in order to properly apply the operation to the related file or files, a snapshot of the information is taken at step 1208. (Non-limiting examples of operations that might require the saving of additional information are delete and cut operations. A non-limiting example of information to be captured is the saving of current state of an element such as a control.) At step 1210 the snapshot is stored in a snapshot store. In one embodiment of the invention, the snapshot store is a hash table keyed on element identifier and includes element identifier and the serialized code object capturing the pre-operation state of the element. At step 1212 an operation unit identifying the operation and the element on which the operation operates is added to an operation store. In one embodiment the operation store is a last-in-first-out (LIFO) stack but any suitable storage mechanism may be used. In one embodiment the stack will include various operations. In another embodiment of the invention, different operations are stored in different stacks. If at step 1206, the operation is not an operation on an element that requires saving information, at step 1214 it is determined if the operation is an undo or a redo operation or the like. If the operation is not an undo or a redo operation or the like, processing continues at step 1204. If the operation is an undo or a redo operation or the like, the operation store is accessed, the appropriate operation unit is called (step 1215) and the operation and the element to be undone or redone is determined. Corresponding saved information from the snapshot store is retrieved (step 1216). The undo or redo is applied to the first file, the information retrieved from the snapshot store (i.e., the third element) is applied to the element (i.e., the first element) operated on and the result (i.e., the second element) is applied to the related file or files. Alternatively, the snapshot (i.e., the second element) is retrieved from the snapshot store and applied directly to the related file or files. The operation unit identifying the undo or redo operation and the element operated on is added to the appropriate operation store at step 1218. Processing continues at step 1204.

Referring again to FIG. 12, for example, at step 1202, the Design Editor 216 is accessed and WebForm document 300 is opened. Assume that WebForm document 300 includes Button1 402 (element one). Preferably, associated Code-Behind document 500 is also opened automatically by the Design Editor 216. Assume that associated Code-Behind file 500 contains a declaration 504 and an event 502 associated with Button1 402, automatically placed in Code-Behind file 500 by Design Editor 216 as a result of adding Button1 402 in WebForm 300. The event 502 is associated with an event handler clause 502a. Event 502 and event handler clause 502a comprise particular code (element two) of Code-Behind file 500 associated with Button1 (element one) of WebForm document 300.

At step 1204, an editing operation is performed. For example, assume that a button is moved from one location to another within document 300, or background color is changed. At step 1206, a notification is sent to Listener Manager 218. Listener Manager 218 determines that this editing operation is not one that requires additional information such as state to be saved. At step 1214, it is determined that this is not an undo or redo operation so processing returns to step 1204. At step 1204 a control (e.g., Button1 402) is selected and deleted. At step 1206, a notification is sent to Listener Manager 218. In one embodiment, a change service notification (e.g., OnComponentRemoving) is used to detect that a control (i.e., Button1) is being removed from the WebForm document 300. Preferably notifications fired as part of destroying or closing document 300 are ignored. It is determined that this is an operation for which state needs to be saved, so processing continues at step 1208.

At step 1208, a snapshot is taken. In one embodiment the snapshot is taken by calling a module (e.g., CodeDomSerializer.Serialize) on the serializer associated with the type of control, (in this case, a Button control). At step 1210 the snapshot is stored. In one embodiment, the snapshot is a code object generated by the serializer. In one embodiment the code object is stored in a hash table keyed off the unique identifier of the control (e.g., Button1). The hash table includes the key (Button1) and a value (the code object).

An operation unit is added to the operation store at step 1212. In one embodiment the Undo/Redo Manager keeps track of operations than can be undone or redone by maintaining a LIFO (last in first out) stack of undo and redo units. Every editing operation that can be undone generates an undo unit. Every undo operation generates a redo unit. Hence, when an element such as Button1 is deleted, a parent undo unit is created and is added to the stack of undo units. When the notification is fired, a new instance of a custom undo unit (i.e., an operation unit) is created. The pre-made operation unit itself may be customized or overridden. The operation unit is created to hold the code-behind data (e.g., the state of Button1) from Code-Behind document 500 and in one embodiment is added as a child of the parent undo unit created when Button1 was deleted from WebForm document 300. In one embodiment, the child undo unit is added to the parent undo unit through IOleUndoManager.Add. In one embodiment, operation units cache the code object and respective code DOM serializer(s) and do not hold references to live controls or to their corresponding designer instances.

Processing returns to step 1204. Assume that the next editing operation that is performed is "undo", that is, just-deleted Button1 is to be re-instated in WebForm 300. When Button1 is regenerated by the undo, Button1 does not have the original properties associated with it in the Code-Behind file. At step 1206 it is determined that the editing operation is not an operation requiring state to be stored, and processing proceeds to step 1214. At step 1214 it is determined that the editing operation is an undo or redo. The editing operation is undone on the first file. In one embodiment a notification is sent that preferably includes the unique ID (Button), and the operation (undo). In one embodiment, this notification is a call to OleUndoUnit::Do. At step 1215, the appropriate operation unit is retrieved. (e.g., through IOleUndoUnit::Do). In one embodiment Undo/Redo Manager implements the undo. Undo/Redo Manager retrieves the operation unit from the operation store and calls IOleUndoUnit::Do. IOleUndoUnit::Do places the new operation (undo) unit on a redo stack and adds Button1 back to WebForm document 300. When Button1 is regenerated by Undo/Redo Manager, Button1 does not have the original properties associated with it in the Code-Behind file. At step 1216 a notification is sent indicating that a control whose unique ID is "Button1" has been added to WebForm 300. In one embodiment the cached code-behind information is retrieved from the hash table from the unique key (e.g., Button1) and the state stored in the code object is applied on the appropriate control instance by calling CodeDomSerializer.Deserialize. Deserialization applies the state stored in the code object to an instance (e.g., Button1). Hence, the code object that the serializer returned in step 1208 is retrieved from the hash table and the deserializer applies the properties stored in the code object to the Button1 control. Preferably, the code object can be applied to the same instance or to a different instance of the same type of control.

Hence Button1 (element one) is added back to WebForm 300, and the appropriate code (element two) is added back to Code-Behind file 500. At step 1218, the undo operation unit is added to the operation store. In one embodiment the operation unit is added to the operation store by calling IOleUndoManager.Add). The operation unit is added to the operation store so that the operation can be redone, if desired. It should be understood that although the example demonstrated a delete and an undo, an undo and a redo, any combination of undos and redos or the like may be performed, limited only by the size of the operation store or stores. Processing continues at step 1204.

Conclusion

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A computer-implemented method for performing a plurality of editing operations on a plurality of files simultaneously, the method comprising:
   a computer opening the plurality of files, the plurality of files comprising at least a first file comprising a WebForm and a first element, and a second file comprising a Code-Behind file that is separate from but related to the first file and comprising a second element that is different than but related to the first element of the first file such that an editing operation performed on the first element of the first file requires an editing operation to be performed on the second element of the second file;
   the computer receiving a notification that a first editing operation is to be performed on the first element of the first file, wherein performance of the first editing operation on the first element of the first file will result in a second editing operation being automatically performed on the second element of the second file;
   upon receiving the notification, the computer determining whether the first editing operation is one that is capable of being reversed, and when the first editing operation is capable of being reversed, automatically capturing the pre-operation state of at least the second element in the second file within persistent storage and storing within an operation store an operation unit representative of the operation and state of the operation performed for the first element and the second element;
   after the first editing operation has been performed on the first element of the first file and the second editing operation has been automatically performed on the second element of the second file, the computer receiving a command to reverse the first editing operation on the first element of the first file; and
   in response to the command, the computer automatically retrieving the pre-operation state of the second element of the second file and the operation performed on the second element from the operation store and applying the retrieved state and operation of the second element to the second file to automatically reverse the second operation performed on the second element, wherein the reverse operation comprises reapplying the state and operation on the second element and storing the operation unit and operation state for the reverse operation in persistent storage.

2. The method of claim 1, wherein the command is one of an undo operation or a redo operation and the command produces changes that are not the same for a WebForm file as they are for a Code-Behind file.

3. The method of claim 1, wherein in response to determining that the first element is not the same as the second element, the computer persisting a third element and an identifier of the first element in a first store within the persistent storage.

4. The method of claim 3, wherein the second element is the same as the third element.

5. The method of claim 3, wherein the second element is generated by applying the third element to the first element.

6. The method of claim 3, wherein the first store is a hash table, keyed on a first element identifier.

7. The method of claim 3, further comprising adding an operation unit identifying the first editing operation and an identifier of the first element to an operation store within the persistent storage.

8. The method of claim 3, wherein in response to receiving the command, the method further comprises:
   the computer retrieving an operation unit state associated with the first editing operation from an operation store, wherein the operation unit state comprises an element identifier and associated state for the element;
   the computer retrieving an identifier of the first element from the operation unit state;
   the computer retrieving the third element associated with the identifier of the first element from the first store;
   the computer applying the third element to the first element to generate the second element; and
   the computer applying the second element to the second file.

9. The method of claim 8, further comprising the computer adding a second operation unit to the operation store, the second operation unit identifying the command and the identifier of the first element to an operation stack.

10. The method of claim 1, wherein in response to receiving the command, the method further comprises:
    the computer retrieving an operation unit state associated with the first editing operation from an operation store, wherein the operation unit state comprises an element identifier and associated state for the element;
    the computer retrieving an identifier of the first element from the operation unit state;
    the computer retrieving the pre-operation state of the second element associated with the identifier of the first element from the persistent storage; and
    the computer applying the second element to the second file.

11. The method of claim 1, wherein the plurality of files are documents.

12. The method of claim 1, wherein the first editing operation is one of a delete or a cut.

13. The method of claim 1, wherein the first element is a control.

14. The method of claim 1, wherein the second element is a state of the control.

15. The method of claim 14, wherein a serializer persists the state of the control as one of a code object, XML, string or BLOB.

16. A computer-readable storage medium including computer-readable instructions for performing a plurality of editing operations on a plurality of files simultaneously, the instructions, when executed on a computer, causing the computer to:
    open the plurality of files, the plurality of files comprising at least a first file comprising a WebForm and a first element, and a second file comprising a Code-Behind file that is separate from but related to the first file and comprising a second element that is different than but related to the first element of the first file such that an editing operation performed on the first element of the first file requires an editing operation to be performed on the second element of the second file;
    receive a notification that a first editing operation is to be performed on the first element of the first file, wherein performance of the first editing operation on the first element of the first file will result in a second editing operation being automatically performed on the second element of the second file;
    upon receiving the notification, determine whether the first editing operation is one that is capable of being reversed, and when the first editing operation is capable of being reversed, automatically capture the pre-operation state of at least the second element in the second file within persistent storage and storing within an operation store an operation unit representative of the operation and state of the operation performed for the first element and the second element;

after the first editing operation has been performed on the first element of the first file and the second editing operation has been automatically performed on the second element of the second file, receive a command to reverse the first editing operation on the first element of the first file; and in response to the command, automatically retrieve the pre-operation state of the second element of the second file and the operation performed on the second element from the operation store and apply the retrieved state and operation of the second element to the second file to automatically reverse the second editing operation performed on the second element, wherein the reverse editing operation comprises reapplying the state and operation on the second element and storing the state and the operation unit for the reverse editing operation in persistent storage where an editing command produces changes that are not the same for the first file as they are for the second file.

* * * * *